United States Patent [19]

Landry et al.

[11] Patent Number: 5,450,438

[45] Date of Patent: Sep. 12, 1995

[54] FALLBACK METHOD TO 1200 BITS PER SECOND FOR USE IN MOBILE RADIO

[75] Inventors: Joan E. Landry, Safety Harbor; Mahendra Patel, Brandon; Robert E. Scott, Indian Rocks Beach, all of Fla.

[73] Assignee: AT&T Corp., Murray Hill, N.J.

[21] Appl. No.: 96,541

[22] Filed: Jul. 26, 1993

[51] Int. Cl.⁶ ............................................. H04L 1/00
[52] U.S. Cl. ................................. 375/222; 375/377; 379/93; 379/98; 379/59; 348/405; 348/406
[58] Field of Search ........................... 379/59, 93, 98; 348/405, 406; 375/8, 121

[56] References Cited

U.S. PATENT DOCUMENTS

| | | | |
|---|---|---|---|
| 4,931,250 | 6/1990 | Greszczwk | 375/8 |
| 4,956,851 | 9/1990 | Wolensky et al. | 375/8 |
| 5,007,047 | 4/1991 | Sridhar et al. | 375/8 |
| 5,050,004 | 9/1991 | Morton, Jr. | 358/406 |
| 5,159,465 | 10/1992 | Maemura et al. | 358/405 |
| 5,241,565 | 8/1993 | Kloc et al. | 375/8 |
| 5,297,186 | 3/1994 | Dong | 375/121 |

*Primary Examiner*—Curtis Kuntz
*Assistant Examiner*—Dwayne D. Bost
*Attorney, Agent, or Firm*—Joseph J. Opalach

[57] ABSTRACT

In a mobile data communications system, a near-end modem initiates a data connection to a far-end modem at the highest permissible data rate, e.g., at 9600 bits per second (bps). If the communications channel subsequently degrades, either the near-end modem, or the far-end modem, initiates an autorate, or fallback sequence, e.g., to 4800 bps. However, if channel performance is still poor at 4800 bps, then one, or both, of the modems initiate a fallback to 1200 bps—skipping over the data rate of 2400 bps, which is not included within the fallback sequence.

23 Claims, 5 Drawing Sheets

SNR THRESHOLD TABLE

| DATA RATE | SNR BAD VALUE | SNR GOOD VALUE |
|---|---|---|
| 1200 | — | — |
| 4800 | 10 | 22 |
| 7200 | 16 | 23 |
| 9600 | 19 | 26 |
| 12,000 | 23 | 28 |
| 14,400 | 25 | N/A |

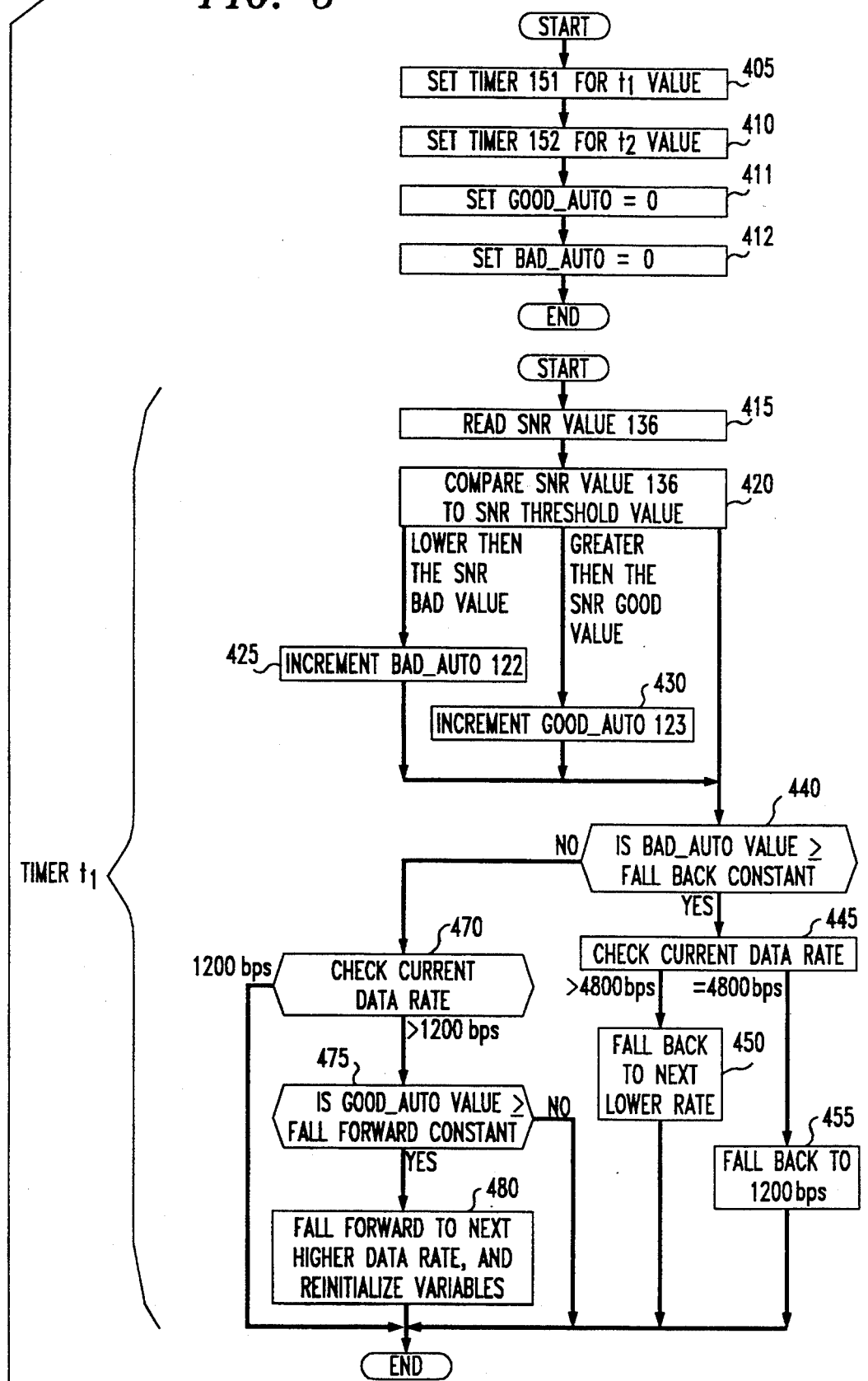

FALLBACK METHOD TO 1200 BITS PER SECOND FOR USE IN MOBILE RADIO

BACKGROUND OF THE INVENTION

The present invention relates to mobile radio and, more particularly, to mobile data communications.

A mobile data communications channel is referred to as an "impaired channel" since it is affected by a number of channel impairments like Rayleigh fading, co-channel interference, etc., that increase the error rate and, thus, decade the overall performance of the mobile data connection. One form of mitigating the affects of an impaired channel is to simply apply land-line modem standards to the mobile radio environment.

In the lid-line modem arena, International Telephone and Telegraph Consultative Committee (CCITT) standard V.32bis is a representative modulation standard. In V.32bis, during the "start-up mode," or "connection phase," both modems, or endpoints, establish the data connection, e.g., perform a "handshaking" sequence to establish the modulation standard error control, and the data rate. After the start-up mode, the "data mode," or "communications phase" is entered in which data, or information, is exchanged between the two modems over the mobile data communication channel. One of the features of V.32bis is the ability to sequentially "autorate" upwards or downwards between 4800 bits per second ((bps) and 14400 bps during either the start-up mode or the data mode as a function of the error characteristics of the communications channel. For example, if a land-line data connection is initially established between two modems at 14400 bps and the error rate subsequently increases beyond a predetermined threshold, one, or both, of the modems will negotiate a data rate change down to the next lowest data rate. In this example, the data rate would change from 14400 bps to 9600 bps. At the latter data rate, information is then transmitted for a period of time to monitor the resulting error rate. If the error rate is still above a predetermined threshold, one or both, of the modems will, again, negotiate a data rate change down to 4800 bps. On the other hand, if the error rate decreases for a period of time while transmitting data 9600 bps, one, or both, of the modems will negotiate a data rate change to the next highest data rate, i.e., from 9600 bps to 14400 bps. In either event, the autorate feature takes advantage of the fact that the error rate of a communications channel is typically also a function of the data rate, i.e., the higher the data rate, the likelihood of an error increases.

Thus, in the context of a mobile data communications channel, the land-line autorate feature is used to assist in mitigating the affect of an impaired channel on the communication of information between two modems. If transmitting at 14400 bps and the error rate increases beyond a predetermined threshold, one, or both, of the modems will negotiate a data rate change to 9600 bps in an attempt to improve the performance of the mobile data communications channel. Unfortunately, if the last permissible data rate is reached, i.e., 4800 bps, under the V.32bis modulation standard, one, or both, of the modems simply disconnect if the data communications channel continues to be severely impaired.

Another alternative approach is represented by the MNP-10 protocol developed by Microcom Inc. specifically for mobile data communications. In this approach, the MNP-10 protocol initiates a data connection at 1200 bps and allows sequential autorating at all data rates between 1200 bps and 14400 bps as a function of the error rate of the mobile data communications channel. For example, a modem running the MNP-10 protocol can increase the data rate in a sequence of steps, i.e., from 1200 bps to 2400 bps to 4800 bps to 7200 bps to 9600 bps to 12000 bps to 14400 bps if the resulting error rates are low enough; or the modem can decrease the data rate in a sequence of steps in the opposite direction if the error rates are high enough. For example, if the data rate is 14400 bps, i.e., MNP-10 provides for a fallback ability, in sequence, from 14400 bps to 12000 bps to 9600 bps to 7200 bps to 4800 bps to 2400 bps to 1200 bps until an acceptable error rate is reached. If the data rate finally reaches 1200 bps and the error rate is still too high, one, or both, of the modems will disconnect. During start-up mode, an MNP-10 modem can be strapped to initiate the data connection at either 1200 bps or 4800 bps. However, like V.32bis, there is no autorating below 4800 bps during the start-up mode, so that if there are problems in just establishing the data connection, one, or both, of the MNP-10 modems will disconnect.

SUMMARY OF THE INVENTION

Although the above-described sequential autorating techniques mitigate the affects of an impaired channel on a mobile data connection, we have discovered a method and apparatus that further improves the overall performance of a mobile data connection. In particular, we have recognized that the overall performance of a mobile data connection at 2400 bps is actually worse than the overall performance at 4800 bps. This is because at 4800 bps wherein transmission at 2400 bps utilizes the V.22bis standard and transmission at 4800 bps utilizes the V.32 standard there are 2 bits per baud, or, alternatively, 4 "points" in the signal constellation, while at 2400 bps there are 4 bits per baud, or 16 "points" in the signal constellation. The higher density signal constellation at 2400 bps results in a 2400 bps data rate being more susceptible to channel impairments. In addition, we have recognized that due to the characteristics of an impaired channel, it is beneficial to autorate below 4800 bps, if necessary, during the start-up mode to establish the data connection rather than to disconnect as in the prior art. Therefore, we have realized an autorating technique that is not sequential but skips over 2400 bps and goes directly from 4800 bps to 1200 bps in either the start-up mode or the data mode. This results in a faster operation than the prior art because no time is spent at 2400 bps measuring the error rate of the mobile data communications channel, i.e., the step of sequentially autorating to 2400 bps is eliminated.

BRIEF DESCRIPTION OF THE DRAWING

FIG. 5 is a flow diagram of another method for use in the modem of FIG. 1; and

DETAILED DESCRIPTION

Figure 1:
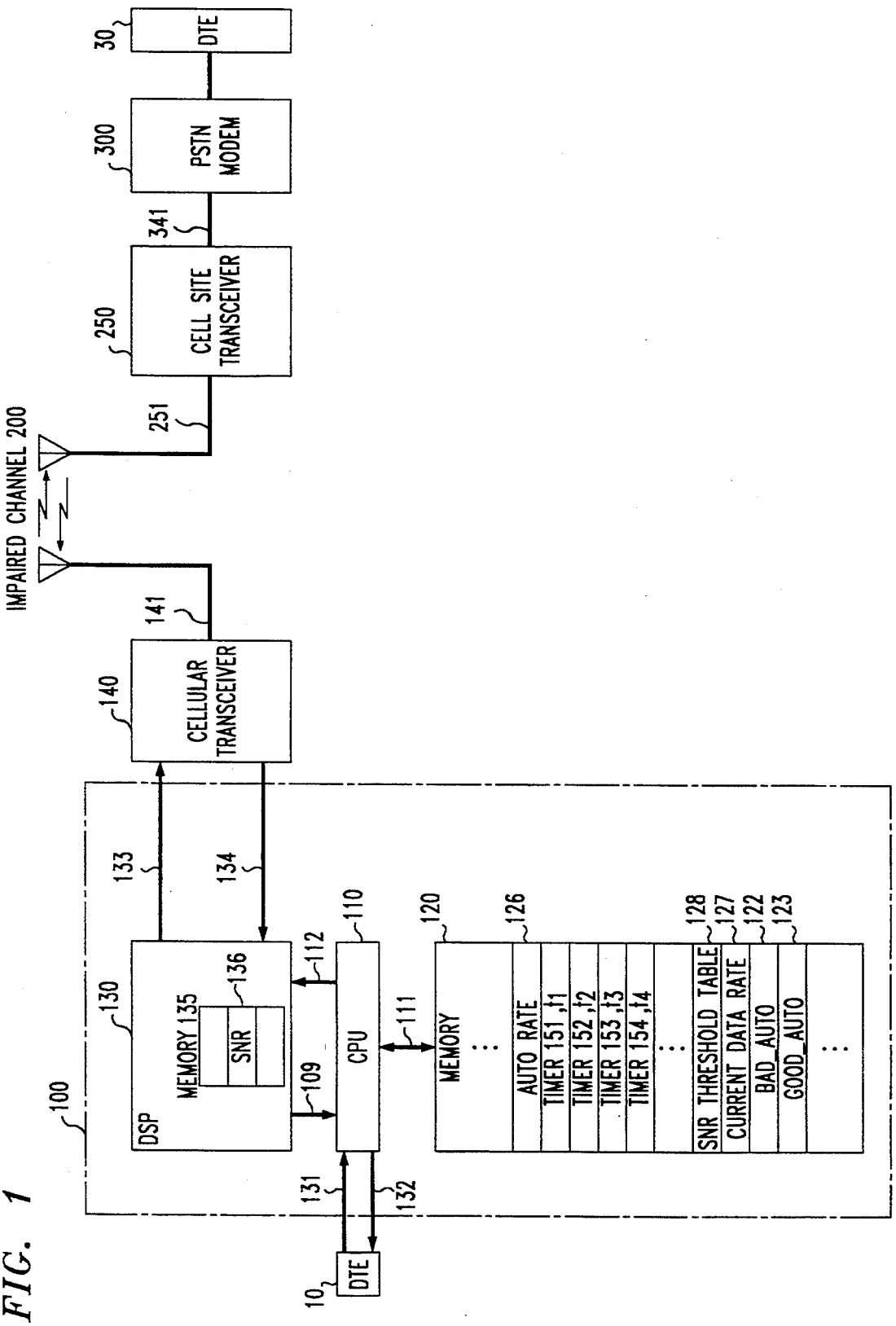
FIG. 1 is a block diagram of a mobile data communications system that includes a cellular modem embodying the principles of the invention.

FIG. 1 shows a block diagram of a mobile data communications system that includes a cellular modem, which embodies the inventive concepts of this invention. As shown, cellular modem 100 is coupled to cellular transceiver 140 for transmitting to, and receiving information from, PSTN modem 300 via cell site transceiver 250, impaired channel 200, and public switched network facility 341. The latter includes a Mobile Telecommunications Switching Office (MTSO), etc., for establishing a PSTN connection to PSTN modem 300. Both cellular modem 100 and PSTN modem 300 are also coupled to respective data terminal equipment 10 and 30. For the purposes of the following description, it is assumed that cellular modem 100 and PSTN modem 300 are similar in design, i.e., they both embody the inventive concept.

Generally speaking, the following is a brief overview of the operation of cellular modem 100 for transmitting and receiving data. A data signal for transmission to PSTN modem 300 is applied to CPU 110, via line 131, from data terminal equipment 10. CPU 110 formats this data signal as is known in the art and applies a formatted data signal, via line 112, to digital signal processor (DSP) 130. The latter modulates this formatted data signal and provides a modulated data signal to cellular transceiver 140, which further modulates and transmits this modulated data signal to cell site transceiver 250 on a predefined cellular carrier signal via antennae 141. Similarly, antenna 141 receives a modulated cellular carder signal transmitted by cell site transceiver 250, and provides this signal to cellular transceiver 140. The latter demodulates this received modulated cellular carrier signal and provides a received modulated data signal to DSP 130 via line 134. DSP 130 demodulates the received modulated data signal and provides a formatted received data signal on line 109 to CPU 110. The latter then provides a received data signal to data terminal equipment (DE) 10 via line 132. This received data signal represents information transmitted by DTE 30 to DTE 10 via PSTN modem 300, PSTN facility 341, and cell site transceiver 250.

DSP 130 comprises DSP memory 135 for providing a number of storage locations, like signal-to-noise ratio (SNR) value 136 (described below), which are accessible to CPU 110 via line 109, i.e., lines 109 and 112 represent both control and data signals. CPU 110 is a microprocessor based central processing unit which operates on, or executes, program data stored in memory 120 via line 111, which is representative of control, address, and data signals (not shown). The program data is represented by autorate subroutine 126, timers 151 through 154, SNR threshold table 128, and the variables: current data rate 127, bad_auto 122, and good_auto 123 (described below). Timers 151 through 154 represent "software timers," each providing an indication of the expiration of time intervals $t_1$, $t_2$, $t_3$, and $t_4$, respectively.

Figure 2:
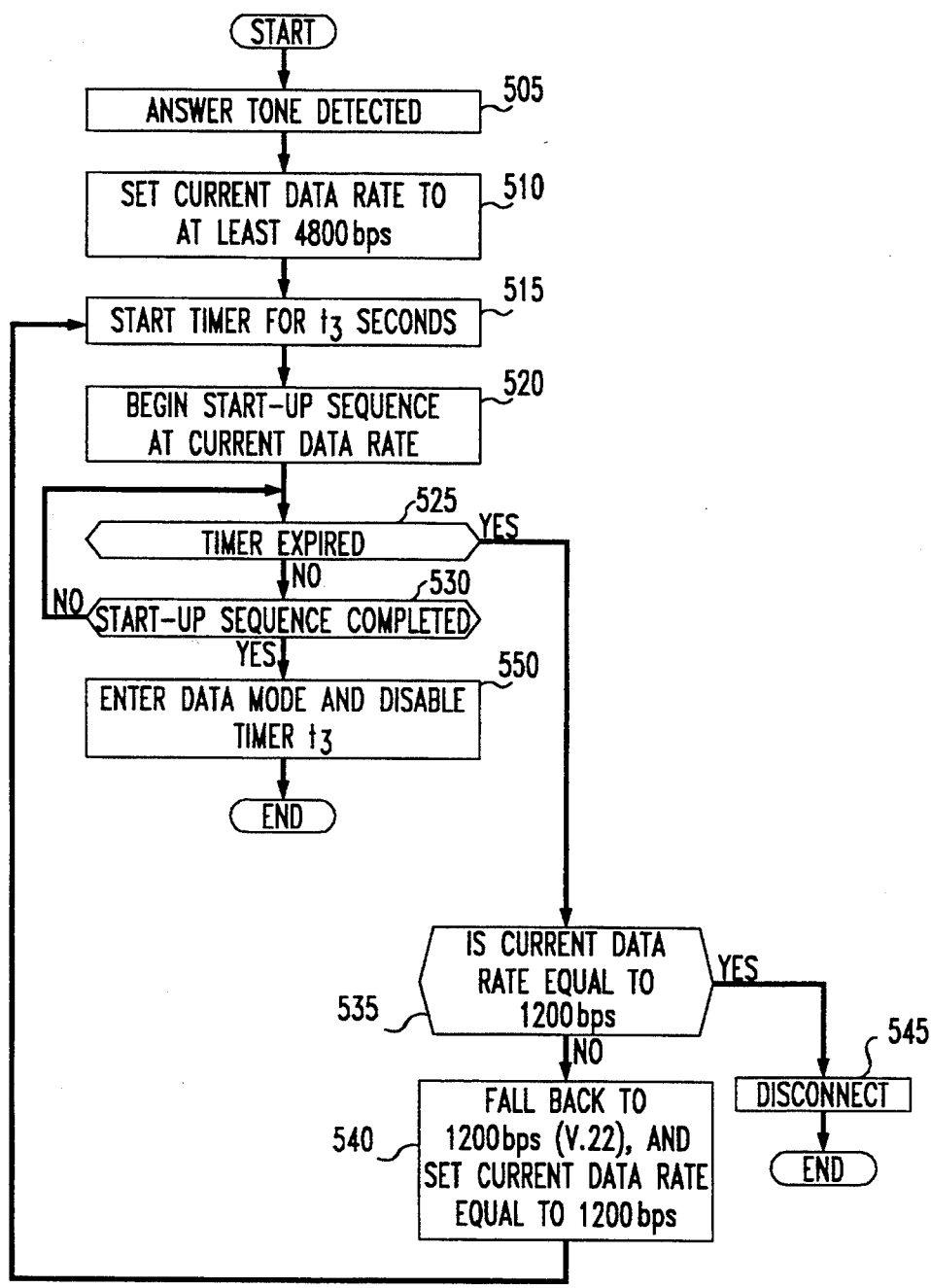
FIG. 2 is a flow diagram of an illustrative method for use in the modem of FIG. 1.

In order to facilitate understanding the inventive concept reference should now be made to FIG. 2, which represents a first illustrative method implemented by autorate subroutine 126 that is executed by CPU 110. In this example, it is assumed that cellular modem 100 is in the start-up mode, i.e., cellular modem 100 has dialed a telephone number corresponding to PSTN modem 300, which has answered the telephone call. As known in the art, cellular modem 100 is the originating modem and PSTN modem 300 is the answering modem.

As shown in FIG. 2, CPU 110 of cellular modem 100 detects answer tone from PSTN modem 300 in step 505. CPU 110 then initializes the value of current data rate 127 of memory 120 to a data rate of 4800 bps. In step 515, CPU 110 sets timer 153 for $t_3$ seconds, which for the purposes of this example is equal to 30 seconds. CPU 110 then begins a "start-up" sequence at the current data rate with PSTN modem 300 in step 520. This start-up sequence includes both "training" and "error control negotiation." These terms, "training" and "error control negotiation," refer to those known standards, except for the inventive concept, whereby two modems attempt to establish a data connection, e.g., training like in CCITT standard V.32bis, and error control negotiation like in CCITT standard V.42. In step 525, CPU 110 checks to see if timer $t_3$ has expired. If timer $t_3$ has not expired, CPU 110 then checks if the start-up sequence is complete in step 530. If the start-up sequence is complete, i.e., a data connection has been established with PSTN modem 300, then CPU 110 enters the dam mode an disables timer $t_3$ in step 550.

Typically, the start-up sequence is complete before the expiration of timer $t_3$. However, if there are problems, e.g., errors occurring on the communications channel, these errors delay the establishment of the data connection. As a result, in step 530, the start-up sequence will not be complete and CPU 110 then executes step 525 to check the value of timer $t_3$. If the start-up sequence is not completed before the expiration of timer $t_3$, then CPU 110 executes step 535 and checks the value of current data rate 127. If the value of current data rate 127 is not equal to 1200 bps, then CPU 110, counter to what is done in the prior art, initiates a fallback to 1200 bps, and sets the current dam rate equal to 1200 bps in step 540. As shown in FIG. 2, in step 540 CPU 110 switches to a CCITT V.22 compatible mode of modulation. CPU 110 then again attempts to establish a data connection with PSTN modem 300 by restarting timer $t_3$ in step 515 and again initiating a start-up sequence with the far-end modem in step 520. On the other hand, if the value of current data 127 in step 535 is equal to 1200 bps, then CPU 110 disconnects from the telephone call in step 545.

It should be noted that after CPU 110 falls back to 1200 bps and the V.22 modulation scheme, a window of time may exist where the answering modem connects in V.32bis mode. However, recovery from this mismatch occurs because of a "carrier detect" (CD) disconnect timer typically present in all modems (not shown). This CD disconnect timer is set to 10 seconds. For example, when cellular modem 100 falls back to 1200 bps in the V.22 modulation scheme, it goes into "silence." As a result, the answering modem's CD disconnect timer will eventually time-out from the lack of a carrier signal, and the answering modem then switches from the V.32bis mode to V.22 mode thereby becoming synchronized with the originating modem. The CD disconnect timer of the originating modem should be disabled during this time and re-enabled after the successful completion of the start-up mode.

Figure 3:
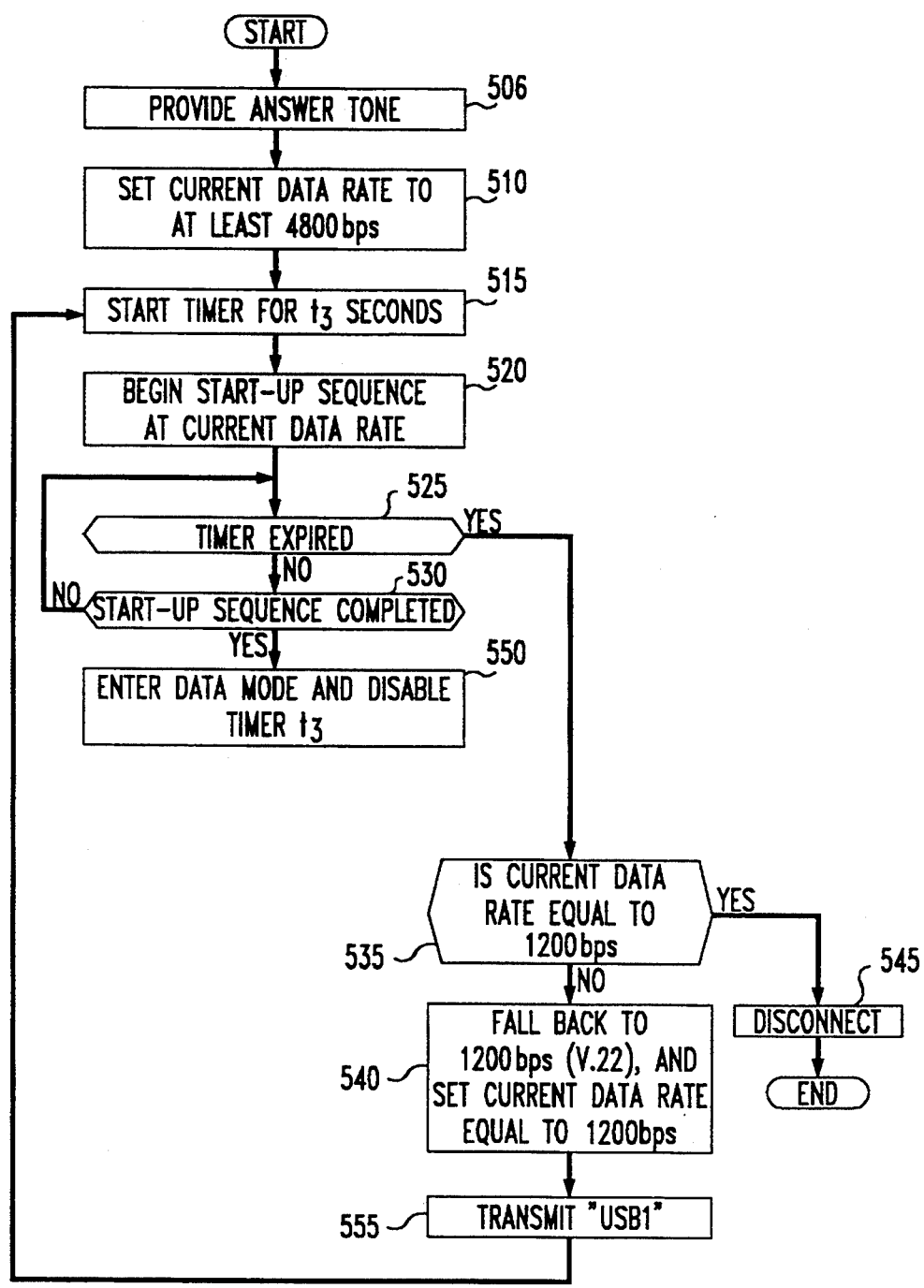
FIG. 3 is a flow diagram of another method for use in the modem of FIG. 1.

As described above, an autorating technique is implemented during the start-up mode of establishing a data connection when cellular modem 100 is the originating modem. In those situations when cellular modem 100 is the answering modem, CPU 110 implements the illustrative method of FIG. 3. The latter is identical to FIG.

2 except for step 506, which replaces step 505 of FIG. 2, and step 555. In the latter step, CPU 110 sends a V.22 defined "USB1" sequence to the far-end modem. This is different from FIG. 2, where CPU 110 switched to the V.22 modulation scheme with silence.

Figures 4, 6:
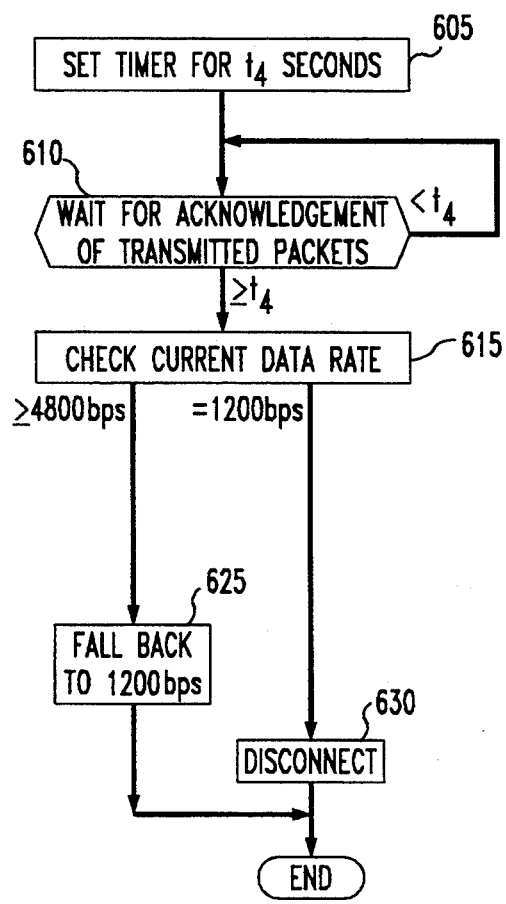
FIG. 4 is a flow diagram of another method for use in the modem of FIG. 1.
FIG. 6 is a table of signal-to-noise ratio threshold values for use in the method of FIG. 5.

Once the start-up mode is completed, cellular modem 100 then enters the data mode, i.e., cellular modem 100 and PSTN modem 300 are transmitting data, or information, between them. Reference should now be made to FIG. 4, which illustrates another method for use during the data mode of operation. It is assumed that any data communicated between cellular modem 100 and PSTN modem 300 is transmitted in packet form. For each packet that is sent, the sending modem expects a positive acknowledgment message from the receiving modem. If a negative acknowledgment is received then typically, the sending modem retransmits the original packet. If there is no data for either cellular modem 100 or PSTN modem 300 to communicate, that modem transmits a null packet, i.e., there is always some data traffic over the communications channel.

In this approach, since there is always some data packet in transmission, even if it is a null packet, the lack of any response, i.e., the lack of any acknowledgment, is used to measure the error rate, or represent an error condition, of the mobile data communications channel. In step 605, CPU 110 sets timer 154 to $t_4$ seconds, which is illustratively equal to 30 seconds for the purposes of this example. This timer runs in the background of any modulation processing, like V.32, being performed by CPU 110. The lack of acknowledgments tests both the transmit and the receive path, i.e., it will show a problem in either direction. In step 610, CPU 110 waits for an acknowledgment for a previously transmitted packet. If CPU 110 waits longer than $t_4$ seconds, then CPU 110 executes step 615 and checks current data rate 127. If the current data rate is greater than or equal to 4800 bps, then CPU 110 initiates a fallback to 1200 bps in step 625. Finally, if the value of current data rate 127 is already equal to 1200 bps, CPU 110 disconnects in step 630.

Another method is shown in FIG. 5. Again, it is assumed that both cellular modem 100 and PSTN modem 300 are in the data mode, and it is assumed that DSP 130 periodically stores or updates SNR value 136 of the modulated received data signal by measuring its mean-squared-error (MSE) and converting the measured MSE to an approximate SNR value, which is then stored in the respective memory location of DSP memory 135.

In the method of FIG. 5, CPU 110 first initializes timers 151 and 152. In step 405, CPU 110 sets timer 151 to expire after time period $t_1$, which is illustratively equal to 1 sec. In step 410, CPU 110 also sets timer 152 to expire after time period $t_2$, which is illustratively equal to 30 sec. Then, in steps 411 and 412, CPU 110 initializes the values of good_auto 123 and bad_auto 122, respectively, to zero.

At the expiration of time period $t_1$, CPU 110 executes step 415 in which CPU 110 reads SNR value 136. In step 420, CPU 110 compares SNR value 136 to an SNR threshold value take from SNR threshold table 128, which is stored in memory 120. An illustrative SNR threshold table is shown in FIG. 6. This table assigns an "SNR bad value" and an "SNR good value" for each data rate. For example, assume that the current data rate, which is stored in memory location 127, is equal to 4800 bps. Then, if SNR value 136 is lower than the SNR bad value, which at 4800 bps is equal to 10, CPU 10 increments the value of the variable bad_auto 122 stored in memory 120 in step 425. On the other hand, if SNR value 136 is higher than the SNR good value, which at 4800 bps is equal to 22, CPU 110 increments the value of the variable good_auto 123 stored in memory 120 in step 430. However, if SNR value 136 is greater than the SNR bad value but less than the SNR good value, CPU 110 does not alter the values stored in good_auto 123 and bad_auto 122. This comparison process is performed by CPU 110 at the expiration of every period of time $t_1$ during the data mode operation.

Upon the expiration of time $t_2$, CPU 110 executes step 440. If the value of variable bad_auto 122 is greater than or equal a predefined FALLBACK constant, e.g., 10, then CPU 110 executes step 445 and checks the value of current data rate 127. If the value of current data rate 127 is greater than 4800 bps, then CPU 110 falls back to the next lowest data rate in step 450. However, if the value of current data rate 127 is equal to 4800 bps, then CPU 110 negotiates a fallback directly to 1200 bps in step 455. Note, for falling back to 1200 bps, one may want to user a larger value for the fall-back constant.

Alternatively, if the value of variable bad_auto 122 is less than the predefined FALLBACK constant, CPU 110 executes step 470. In this step, CPU 110 checks the value of current data rate 127. If the value of current data rate 127 is greater than 1200 bps, then CPU 110 executes step 475, where the value of good_auto 123 is compared to a predefined FALLFORWARD constant, e.g., 20. If the value of good_auto 123 is greater than or equal to 20, then CPU 110 causes cellular modem 100 to fall forward to the next higher data rate, updates the value of current data rate 127, and reinitializes bad_auto 122 and good_auto 123 in step 480. However, if the value of good_auto is less than the FALLFORWARD constant, CPU 110 simply exits the routine. On the other hand, if the data rate in step 470 is equal to 1200 bps, CPU 110 bypasses step 475. This is because the modulation standard used at 1200 bps, e.g., V.22, is very different from the modulation standards used at 4800 bps and higher, e.g., V.32bis,—with the result that a communications channel that is very good for transmission at 1200 bps, as represented by the value of good_auto 123, may provide poorer communications at 4800 bps. In other words, there is no correlation between the value of good_auto 123 at 1200 bps and the ability to transmit data at the next highest data rate. As a result, a fall forward is possible via other methods not shown in the drawing, e.g., an automatic fall forward once a minute.

It should be noted that this invention is compatible with current CCITT dial modulation schemes like V.32bis, and V.32, even though these schemes do not autorate below 4800 bps. For example, assume cellular modem 100 incorporates the principles of this invention and PSTN modem 300 incorporates a V.32bis modulation standard. If the mobile data communications channel subsequently becomes severely impaired and the current data rate is 4800 bps, the V.32bis modem simply disconnects as in the prior art. In other words, even though in this example the mobile data connection cannot take advantage of this inventive concept, the fact that one of the cellular modems incorporates this invention does not prevent it from connecting to modems supporting CCITT standards.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although described above in the context of a cellular environment, this invention is applicable to any data communications channel, e.g., land-lines. In addition, as an alternative approach to detecting the lack of an acknowledgment signal, the number of negative acknowledgments either for a given packet or over a time interval can be accumulated and compared to a threshold, which if exceeded causes the modem to autorate in the appropriate direction. In other words, the "block error rate" over a period of time is compared against a predetermined threshold, which causes the modem to either fall back or fall forward.

We claim:

1. An autorating method for use in a modem, the method comprising the steps of:
   receiving a data signal from a far-end modem at a data rate of at least 4800 bits per second;
   detecting an error condition in the data signal;
   responding to the detection of the error to change the data rate from the at least 4800 bits per second directly to 1200 bits per second.

2. The method of claim 1 wherein the received data signal represents a plurality of received packets and the error condition represents an error in at least one of the received packets.

3. The method of claim 1 wherein the received data signal represents a plurality of received packets and the error condition is the detection of the lack of an acknowledgment signal in these received packets for at least one prior transmitted packet from the modem to the far-end modem.

4. The method of claim 1 wherein the error condition represents a signal-to-noise ratio value for the received data signal that is higher than a predetermined signal-to-noise ratio reference value.

5. The method of claim 1 further including the step of demodulating a cellular carrier signal to provide the data signal before the step of receiving a data signal.

6. An autorating method for use in a modem, the method comprising the steps of:
   transmitting a data signal to a far-end modem at a data rate of at least 4800 bits per second, the data signal representing a plurality of data packets;
   detecting a lack of an acknowledgment signal for at least one of the plurality of data packets; and
   responding to the detection of the lack of an acknowledgment signal to change the data rate from the at least 4800 bits per second directly to 1200 bits per second.

7. The method of claim 6 wherein the step of detecting a lack of an acknowledgment signal includes the step of:
   setting a timer for a predetermined amount of time for the at least one of the plurality of data packets; and
   reaching the end of said predetermined amount of time without receiving the acknowledgment signal for the at least one of the plurality of data packets.

8. The method of claim 7 wherein the step of transmitting the data signal includes the step of modulating a cellular carder with the data signal for transmission to the far-end modem.

9. A method for providing an autorate feature in a modem comprising the steps of:
   receiving a data signal from a far-end modem at a data rate of at least 4800 bits per second;
   counting the errors in the data signal to provide an accumulated number of errors;
   comparing the accumulated number of errors to the predetermined threshold at the expiration of a time interval; and
   changing the data rate from the at least 4800 bits per second directly to 1200 bits per second so that the far-end modem transmits the data signal at 1200 bits per second if the number of detected errors is greater than a predetermined threshold.

10. The method of claim 9 wherein the step of receiving the data signal includes the step of recovering the data signal from a received modulated cellular carrier signal.

11. A method for providing an autorate feature in a modem comprising the steps of:
    receiving a data signal from a far-end modem at a data rate of 1200 bits per second; and
    counting errors in the data signal to provide an accumulated number of errors;
    comparing the accumulated number of errors to the predetermined threshold at the expiration of the time interval; and
    changing the data rate from 1200 bits per second directly to 4800 bits per second if the accumulated number of errors is less than the predetermined threshold.

12. The method of claim 11 wherein the step of receiving the data signal includes the step of recovering the data signal from a received modulated cellular carrier signal.

13. A method for use in a modem for initiating a data connection with a far-end modem, the method comprising the steps of:
    originating a telephone call to the far-end modem;
    detecting an answer tone from the far-end modem;
    initiating a training sequence with the far-end modem, where the training sequence occurs at a data rate of at least 4800 bits per second;
    setting a timer for a predetermined amount of time;
    generating a timer signal upon the expiration of the predetermined amount of time; and
    responding to the expiration of the predetermined amount of time by falling back from the at least 4800 bits per second data rate directly to a data rate of 1200 bits per second.

14. The method of claim 13 wherein the step of initiating a training sequence includes the step of modulating a cellular carrier with a data signal that represents information that is a pan of the training sequence.

15. Apparatus for providing an autorating feature in a modem, comprising:
    means for receiving a data signal from a far-end modem at a data rate of at least 4800 bits per second;
    means for detecting an error condition in the data signal;
    means for responding to the detection of the error to change the data rate from the at least 4800 bits per second directly to 1200 bits per second.

16. Apparatus for providing an autorating feature in a modem, comprising:
    means for transmitting a data signal to a far-end modem at a data rate of at least 4800 bits per second, the data signal representing a plurality of data packets;

timer means for measuring a predetermined amount of time for at least one of the plurality of data frames and for providing an indication of the expiration of the predetermined amount of time; and means responsive to the indication of the expiration of the predetermined amount of time for the at least one of the plurality of data packets for changing the at least 4800 bits per second data rate of the data signal directly to 1200 bits per second.

17. The apparatus of claim 16 wherein the means for transmitting includes a cellular transceiver.

18. Apparatus for providing an autorating feature in a modem, comprising:

means for receiving a data signal from a far-end cellular modem at a data rate of at least 4800 bits per second;

means for detecting errors in the data signal; and means for counting the detected errors and for changing the data rate from the data rate of at least 4800 bits per second directly to a data rate of 1200 bits per second when the count of detected errors exceeds a predetermined threshold.

19. The apparatus of claim 18 wherein the means for receiving includes a cellular transceiver.

20. The apparatus of claim 18 wherein the means for counting includes:

processor means; and memory means for storing program data;

where the processor executes the program data to a) count the detected errors and b) change the data rate of at least 4800 bits per second directly to a data rate of 1200 bits per second when the count of detected errors exceeds the predetermined threshold.

21. The apparatus of claim 20 wherein the processor means includes:

a CPU means; and a timer means for providing a first time-out and a second time-out, where the expiration of the first-time out causes the CPU means to count the detected errors, and the expiration of the second time-out causes the CPU means to change the data rate when the count of detected errors exceeds the predetermined threshold.

22. Apparatus for use in a modem for establishing a data connection with a far-end modem, the apparatus comprising:

means for initiating a training sequence with the far-end modem, where the training sequence occurs at a data rate of at least 4800 bits per second;

timer means for measuring a predetermined amount of time and for providing a timer signal at the expiration of the predetermined amount of time; and means responsive to the timer signal for directly falling back to a data rate of 1200 bits per second if the training sequence is still active.

23. The apparatus of claim 22 wherein the means for initiating includes a cellular transceiver.

* * * * *